(No Model.) 3 Sheets—Sheet 1.
J. H. GREENWOOD.
Planer Chuck.
No. 240,513. Patented April 26, 1881.
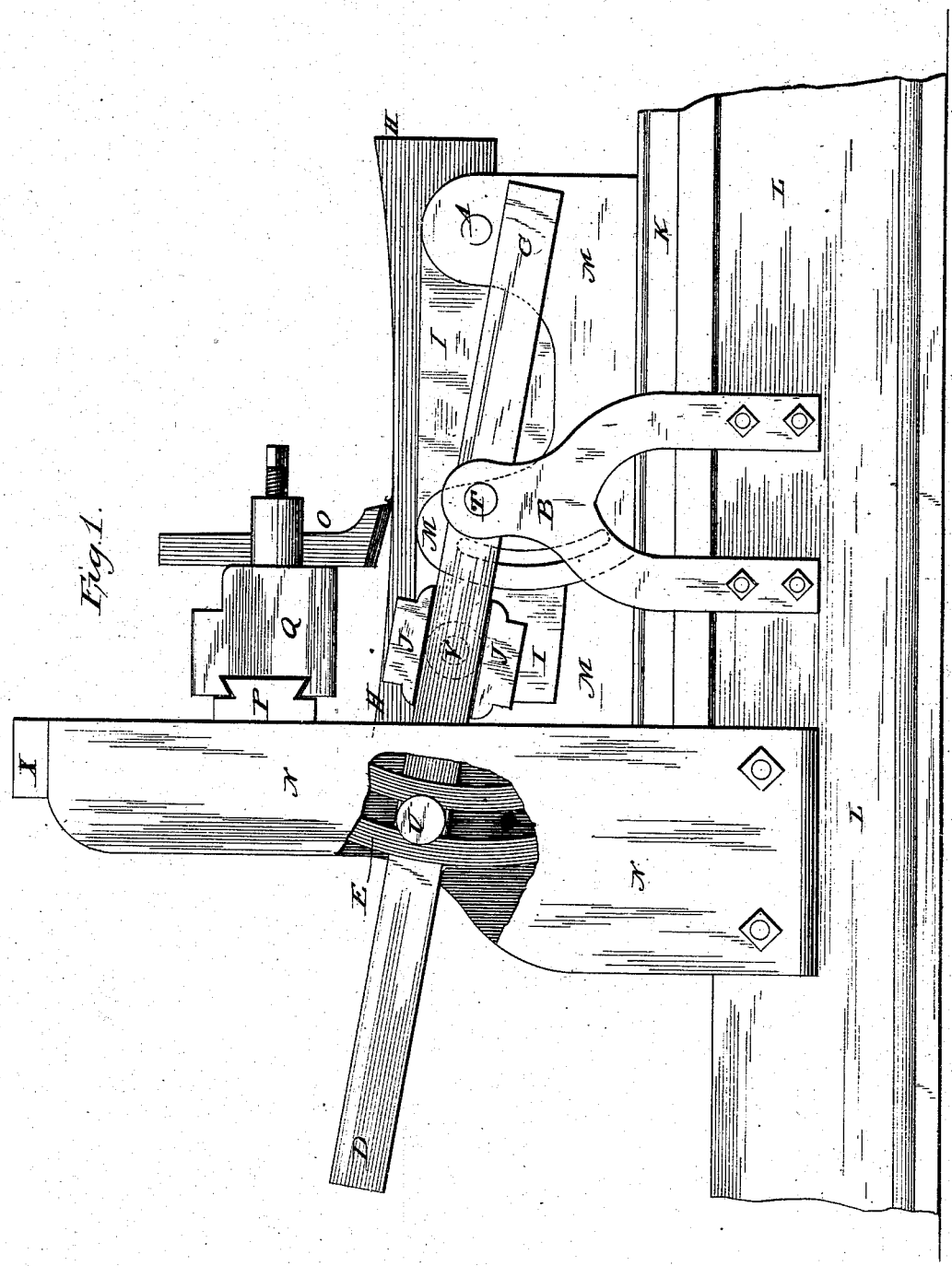
Witnesses.
Sidney P. Hollingsworth
Phil R. Stansbury
Inventor.
J. H. Greenwood
By his Attorneys
Stansbury & Munn

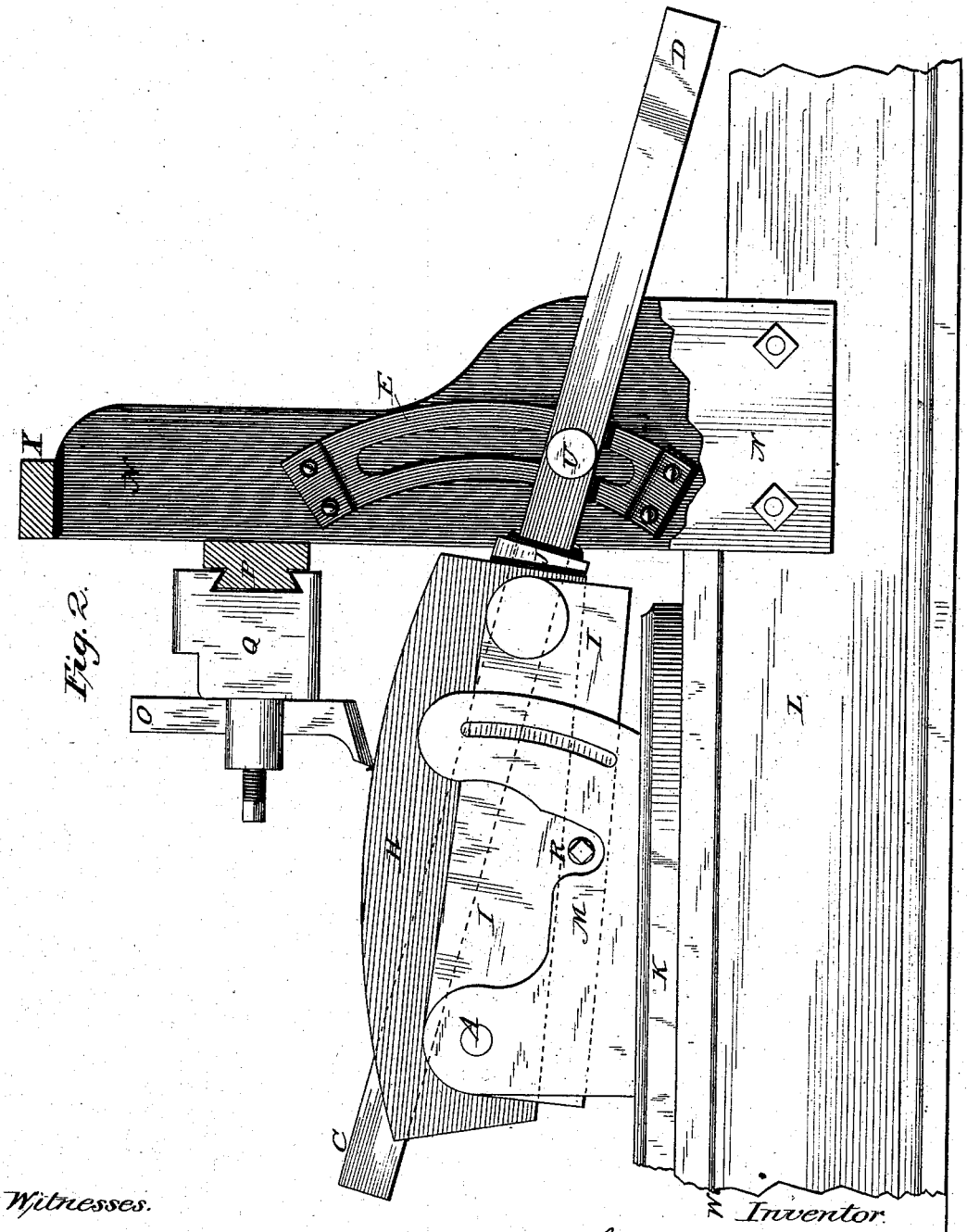

(No Model.) 3 Sheets—Sheet 3.

J. H. GREENWOOD.
Planer Chuck.

No. 240,513. Patented April 26, 1881.

Witnesses.
Sidney P. Hollingsworth
Phil R. Stansbury

Inventor.
J. H. Greenwood,
By his attorneys,
Stansbury & Munn.

UNITED STATES PATENT OFFICE.

JOHN H. GREENWOOD, OF COLUMBUS, OHIO.

PLANER-CHUCK.

SPECIFICATION forming part of Letters Patent No. 240,513, dated April 26, 1881.

Application filed April 19, 1880. (No model.)

*To all whom it may concern:*

Be it known that I, JOHN H. GREENWOOD, of Columbus, in the county of Franklin and State of Ohio, have invented certain new and useful Improvements in Planer-Chucks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 4:
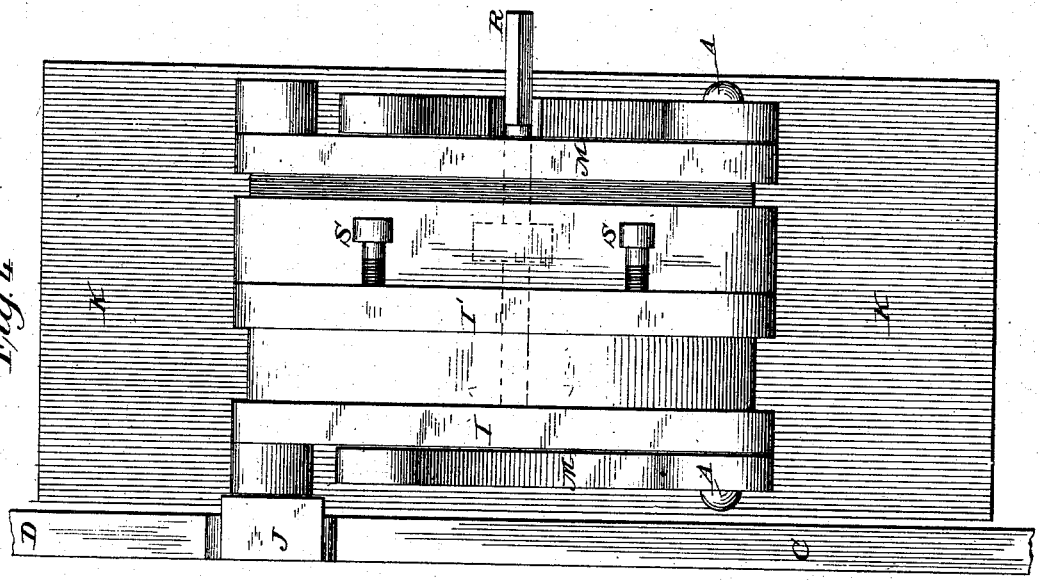
Figure 3:
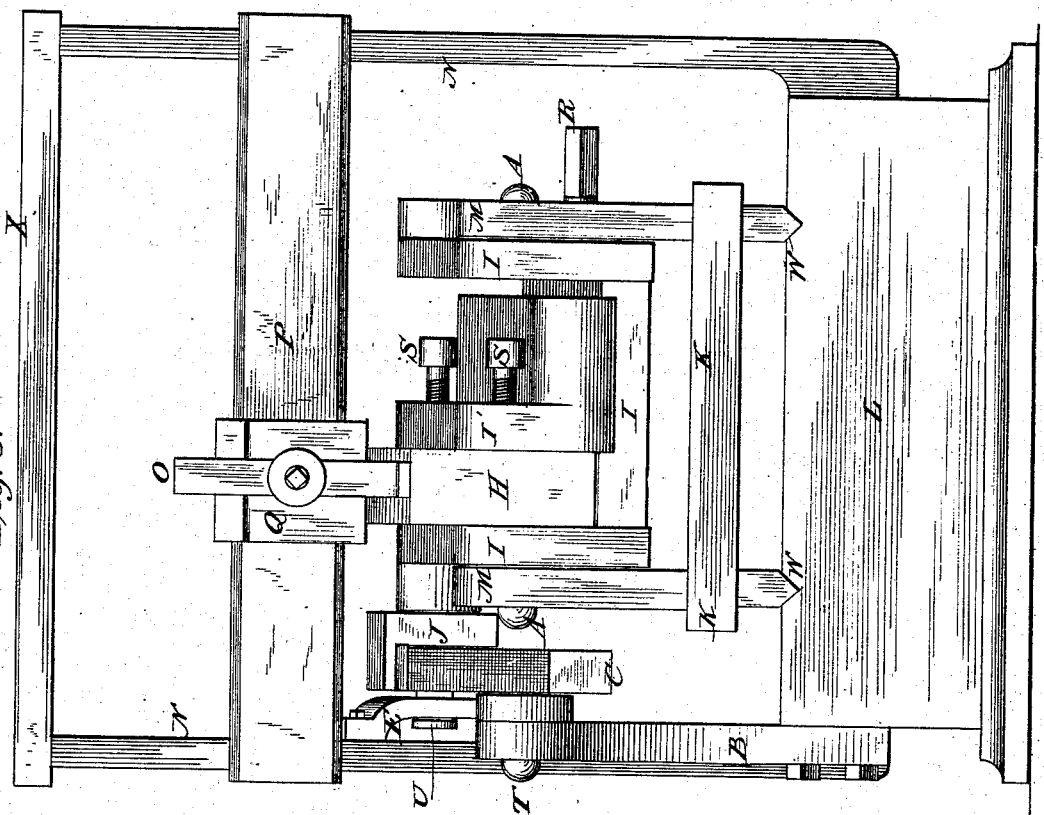

Figure 1 is a side elevation of the chuck attached to the planer. Fig. 2 is an elevation of the opposite side of the chuck and planer, partly in section. Fig. 3 is an elevation of the front end of the machine, and Fig. 4 is a plan or top view of the chuck attached to the sliding bed of the planer.

The same part is indicated by the same letter wherever it occurs in the drawings.

The object of my invention is to provide an adjustable and convertible planer-chuck which shall greatly facilitate the planing of curved surfaces, either convex or concave, while being equally applicable to the planing of angled or straight surfaces.

The nature of my invention consists in attaching to the reciprocating bed of a planing-machine a rocking chuck, which holds the work and carries it under the planing-tool, giving it at each point of its progress the proper inclination to insure its being planed either in a convex or concave curve, or upon a horizontal or inclined surface, as may be required, the action of the chuck being controlled by an adjustable guide-bar, whose angle with the bed-plate can be regulated at pleasure, and which governs the movements of the work relatively to the tool, so that the particular effect desired shall be produced by the combination of the mechanism for imparting horizontal movement to the planer with the mechanism for imparting vertical vibratory movement to the chuck or work-holder, for producing curved work, and of said first-named mechanism and the chuck or holder fixed in a horizontal or inclined position, for the production of horizontal or inclined work, all as hereinafter more fully set forth.

In the drawings, L marks the lower frame of the planer, N the side frame, and X and P the cross-framing.

K is the reciprocating bed-plate, on which the frame M of the chuck is supported and attached. The chuck is provided with a movable jaw, I', between which and the side I the work H is clamped by means of set-screws S S and adjusting-screw R. The chuck I is hung in its frame M by bolts or pivots at A, and rocks on said pivots as the bed K reciprocates.

A cross-head, J, is pivoted to the chuck at V, Fig. 1. It slides on a long guide-bar, C D, which vibrates on a fulcrum, T, at the top of a bracket, B, attached to the side of the planer-frame, as shown in Fig. 1. The fulcrum T is equal in height to the axis A of the chuck.

Near the rear end, D, of the bar C D, and inside of side frame, N, is a slotted graduated arc, to which the bar C D can be clamped at any desired angle by means of the clamp-screw U. The position of the guide-bar C D relatively to this arc regulates the radius of the curve which is to be reproduced in the work. If the rear end, D, of the bar is above a horizontal line drawn through axis A and fulcrum T, the curve of the work will be concave; if below, the curve will be convex, and the radius of the curve, in either case, will depend upon the amount of the obliquity of the bar to said horizontal line, being longest when the obliquity is least and shortest when the obliquity is greatest.

O is the planing-tool, attached to a sliding head, Q, which traverses on a dovetail on the face of the cross-bar P.

The sliding bed K moves longitudinally on ways W on bed-plate L of the machine, as shown in Fig. 3.

The operation is obvious from the construction. The tool O being fixed and the bar C D clamped to the arc E at the line to give the radius of the desired curve, the work H is clamped in the chuck, and reciprocating motion is imparted to the sliding bed K, which carries the chuck with it. The head J slides up and down the rod C D and imparts a rocking motion to the chuck and work, which is thus planed in the arc of a circle, either concave or convex, and of the predetermined radius.

By detaching the head J, and thus disconnecting the chuck and bar, or by setting the bar parallel with the planer-bed, the machine will operate as an ordinary flat planer.

By raising the chuck I in its base M to any required angle (which may be done by means of the clamp-screws and slotted arcs in the side of the chuck-frame) the machine will plane the desired incline.

To insure uniformity of motion between the two sides of the chuck, I contemplate the use of a curved toothed rack, placed on the rear vertical edge of the frame of the chuck, on the opposite side to that next the guide-bar, to receive the teeth of a pinion turning on a shaft passing horizontally through the rear of the moving part of the chuck.

Having thus fully described my invention, what I claim, and desire to secure by Letters Patent, is—

1. In a metal-planer, the combination of a sliding bed, K, rocking chuck I, tool O, head J, bar C D, arc E, and clamp-screw U, all constructed, arranged, and operating in the manner described, for the purposes set forth.

2. In a metal-planer, a curve-cutting mechanism operated by the horizontal longitudinal movement of the reciprocating bed, in combination with the mechanism for producing the rocking movement of the chuck, substantially in the manner described.

3. In a metal-planer, the combination, with a rocking chuck, of the pivoted slide-head J, the adjustable guide-bar C D, and graduated arc E, for the purpose of enabling the machine to plane convex or concave curves of any desired radius, and also straight work, when necessary, all substantially as specified.

4. In a metal-planer, the combination, with the frame of the rocking chuck, of one or more slotted graduated arcs, provided with clamping mechanism, to set the chuck at any desired angle to plane inclined work, as described.

5. The combination, in a metal-planer, of a fixed tool, a bed-plate having rectilinear motion in a horizontal plane, and a chuck having rocking motion in a vertical plane, all in the manner and for the purposes set forth.

6. In a metal-planer, the combination of a hinged work-holder rocking in a longitudinal vertical plane, a horizontal and longitudinally-reciprocating bed, a cutting-tool provided with horizontal transverse and vertical adjustments, and guiding and adjusting mechanism for controlling the position and movement of the work-holder relatively to the planing-tool, all constructed and operating substantially as described.

7. The combination of the sliding plate K, chuck-frame M, chuck-plates I, cross-head J, guide-bar D, and segmentally-slotted plate E, all constructed and operating substantially in the manner described.

8. The combination of the rocking chuck-plates I, cross-head J, and adjustable guide-bar D, all constructed and operating substantially in the manner described.

9. The combination of the frame N, segmentally-slotted plate E, guide-bar D, and the bolts and nuts for securing the guide-bar in position, all substantially as set forth.

10. The combination of the guide-bar D, chuck-plate I, and cross-head J, substantially in the manner specified.

In testimony that I claim the foregoing as my own I affix my signature in presence of two witnesses.

JOHN H. GREENWOOD.

Witnesses:
D. E. WILLIAMS,
J. A. HUTCHINSON.